United States Patent
Yoon et al.

(10) Patent No.: US 10,810,447 B2
(45) Date of Patent: Oct. 20, 2020

(54) GATOREYE SYSTEM FOR SMART TRANSPORTATION

(71) Applicant: University of Florida Research Foundation, Inc., Gainesville, FL (US)

(72) Inventors: Yong Kyu Yoon, Gainesville, FL (US); Sheng-Po Fang, Gainesville, FL (US); Seahee Hwangbo, Gainesville, FL (US); Todd R. Schumann, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 304 days.

(21) Appl. No.: 15/835,598

(22) Filed: Dec. 8, 2017

(65) Prior Publication Data

US 2018/0165526 A1   Jun. 14, 2018

Related U.S. Application Data

(60) Provisional application No. 62/432,085, filed on Dec. 9, 2016.

(51) Int. Cl.
| | |
|---|---|
| *G06K 9/00* | (2006.01) |
| *G06K 7/10* | (2006.01) |
| *G05D 1/00* | (2006.01) |
| *G08G 1/16* | (2006.01) |
| *B60W 30/12* | (2020.01) |

(Continued)

(52) U.S. Cl.
CPC ......... *G06K 9/00798* (2013.01); *B60W 30/12* (2013.01); *G01S 13/751* (2013.01); *G01S 13/876* (2013.01); *G01S 13/91* (2013.01); *G05D 1/0088* (2013.01); *G06K 7/10019* (2013.01); *G08G 1/0116* (2013.01); *G08G 1/0133* (2013.01); *G08G 1/0141* (2013.01); *G08G 1/095* (2013.01); *G08G 1/096775* (2013.01); *G08G 1/096783* (2013.01); *G08G 1/096791* (2013.01);

(Continued)

(58) Field of Classification Search
CPC .............. G06K 9/00; G06K 7/10; G05D 1/00
See application file for complete search history.

(56) References Cited

U.S. PATENT DOCUMENTS

| | | | | |
|---|---|---|---|---|
| 6,694,236 B2 * | 2/2004 | Onodera | ................ | G05G 9/047 |
| | | | | 180/333 |
| 7,034,741 B2 * | 4/2006 | Chon | ..................... | G08G 1/042 |
| | | | | 342/42 |

(Continued)

*Primary Examiner* — Kira Nguyen
(74) *Attorney, Agent, or Firm* — Thomas | Horstemeyer, LLP

(57) ABSTRACT

Various examples are provided for smart transportation and sensing systems. In one example, an apparatus for smart transportation sensing includes a reflector integrated in a contoured roadway unit configured to protect the reflector from damage by vehicles traveling along a transportation surface; and a radio frequency identification (RFID) tag integrated in the contoured roadway unit. In another example, a system for smart transportation includes a vehicle including a radio frequency identification (RFID) reader configured to interrogate RFID tags integrated in reflector units disposed along a transportation surface; and a processing system in communication with the RFID reader, the processing system configured to process data obtained from at least one of the RFID tags to determine vehicle location along the transportation surface.

20 Claims, 3 Drawing Sheets

(51) Int. Cl.
  *G08G 1/0967* (2006.01)
  *G08G 1/01* (2006.01)
  *G08G 1/095* (2006.01)
  *G08G 1/00* (2006.01)
  *G01S 13/87* (2006.01)
  *G01S 13/91* (2006.01)
  *G01S 13/75* (2006.01)

(52) U.S. Cl.
  CPC ............ *G08G 1/167* (2013.01); *G08G 1/205* (2013.01); *B60W 2556/50* (2020.02)

(56) References Cited

U.S. PATENT DOCUMENTS

| | | | |
|---|---|---|---|
| 9,606,224 B2* | 3/2017 | Soderi | G01S 13/84 |
| 2007/0032245 A1* | 2/2007 | Alapuranen | G08G 1/161 |
| | | | 455/456.1 |
| 2008/0042807 A1* | 2/2008 | Park | G06K 17/0022 |
| | | | 340/10.3 |
| 2008/0294585 A1* | 11/2008 | Hwang | G06Q 10/06 |
| | | | 706/47 |
| 2009/0143923 A1* | 6/2009 | Breed | G08G 1/205 |
| | | | 701/1 |
| 2010/0073154 A1* | 3/2010 | Kim | G08G 1/042 |
| | | | 340/435 |
| 2016/0196753 A1* | 7/2016 | Jarrell | G08G 5/0069 |
| | | | 701/16 |
| 2017/0018183 A1* | 1/2017 | Rosen | G08G 1/015 |

\* cited by examiner

GATOREYE SYSTEM FOR SMART TRANSPORTATION

CROSS REFERENCE TO RELATED APPLICATIONS

This application claims priority to, and the benefit of, U.S. provisional application entitled "GatorEye System for Smart Transportation" having Ser. No. 62/432,085, filed Dec. 9, 2016, which is hereby incorporated by reference in its entirety.

BACKGROUND

Interest in autonomous vehicle operation has increased dramatically in the past few years as the available processing power has reached a point where enough data can be handled to facilitate safe operation of the vehicle. Currently, autonomous vehicles use a combination of sensors such as optical and infrared cameras, LIDAR, and ultrasonic sensors to mimic a human's interaction with the world while driving. Although each of these systems adds a necessary facet for autonomous operation, the processing power and infrastructure needed for these sensors is very expensive.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
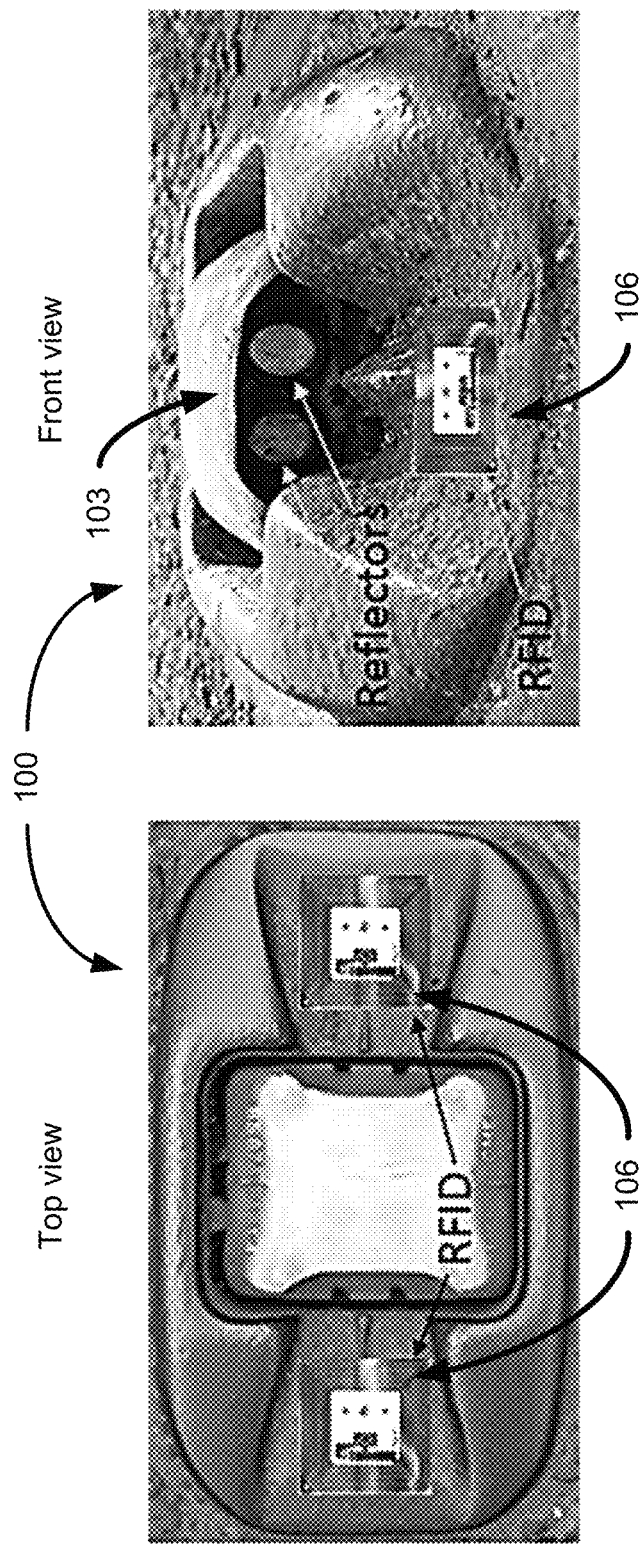
FIG. 1 includes images illustrating an example of a GatorEye unit, in accordance with various embodiments of the present disclosure.

Disclosed herein are various embodiments related to smart transportation and sensing systems. This can be utilized for autonomous and non-autonomous vehicle operation. Reference will now be made in detail to the description of the embodiments as illustrated in the drawings, wherein like reference numbers indicate like parts throughout the several views.

Radio frequency identification (RFID) technologies have become increasingly popular since the tags could operate without an integrated power source. Originally, passive RFID were limited to very few unique identities due to the limited nature of the identifier (phase delay, etc.). However, progression in wireless power transfer has enabled RFID tags which have a very large number of unique identities. For example, automatic toll programs such as SunPass® or EPass use active RFID tags without a power source to identify individual cars passing through toll booths to greatly increase traffic throughput and eliminate toll wait times/speed reduction.

A system which uses RF electronics and integrated sensors to interact with the outside world, as opposed to trying to mimic the human experience, offers a simple yet invaluable addition to autonomous vehicle operation. This disclosure presents a novel upgrade of the cat's eye reflector used for visibility on roads. GatorEyes include integrated powered/non-powered RFID tags identified by unique IDs to allow positioning information for autonomous vehicles. The autonomous vehicles can use these tags to safely navigate roads, even if the lane lines are covered in rain or snow. Additionally, vehicle-to-vehicle communications could be used to add an additional safety measure when performing maneuvers such as changing lanes or slowing at a stop light.

Low power passive/active sensors can be integrated into the RFID tags to provide additional real-time road information (e.g., wetness). Periodic waypoints can also be placed at locations with power connections (e.g. at traffic lights) to collect all the data, which can be sent to a central server for processing. The processed information can be sent to other vehicles and/or emergency crews about road conditions, accidents, hazards, etc. Although designed for autonomous vehicles, the infrastructure can also help the operation of non-autonomous vehicles by providing information to drivers, especially during extreme weather where visibility is low such as in hurricane, storm, heavy snow.

Sensor based methods used by autonomous vehicles to mimic a human's interaction with their environment while driving are very computationally, financially expensive and power demanding. Due to the complexity of trying to interpret human vision, these methods are more prone to algorithm malfunctions and are still susceptible to the same problems that occur with a person's vision. The disclosed method of positional tracking using RFIDs is far less complex, is less prone to algorithm malfunction, demands much less power and processing capabilities, and is more reliable than current methods that interpret optical cameras and GPS positioning. The disclosed system electronically interacts with its surroundings in a much less complex way, leading to less room for algorithm malfunction. This can also alleviate driving problems associated with poor visibility or road cover. Although the disclosed system would not replace all the sensors mentioned above, it can take the lead role in vehicle navigation and complement the detection and sensing roles of other existing systems.

The GatorEye system can use non-powered RFID tags integrated into a traditional cat's eyes that are already in use on roads as part of a three phase infrastructure (lane following, position identification, and traffic/road condition notification). FIG. 1 includes images illustrating an example of a GatorEye unit 100 comprising cat's eye reflectors 103 and integrated RFID tags 106. The RFID tags 106 can be passive, active or a combination of both. The GatorEye unit can include multiple sensors such as, e.g., a moisture sensor, a temperature sensor, an ambient pressure sensor and/or an air pollution sensor, which can be integrated into the unit. The GatorEye unit allows vehicles to identify traffic lanes without needing to expend power on complex line detection algorithms from optical cameras and can be more reliable in a broad range of road conditions (for example if the road was covered in snow or rain). By giving these tags unique addresses, the vehicle's position can be determined and used, as an alternative to GPS, to provide active feedback for road conditions or accidents to following vehicles or emergency crews.

Figures 2A, 2B, 2C:
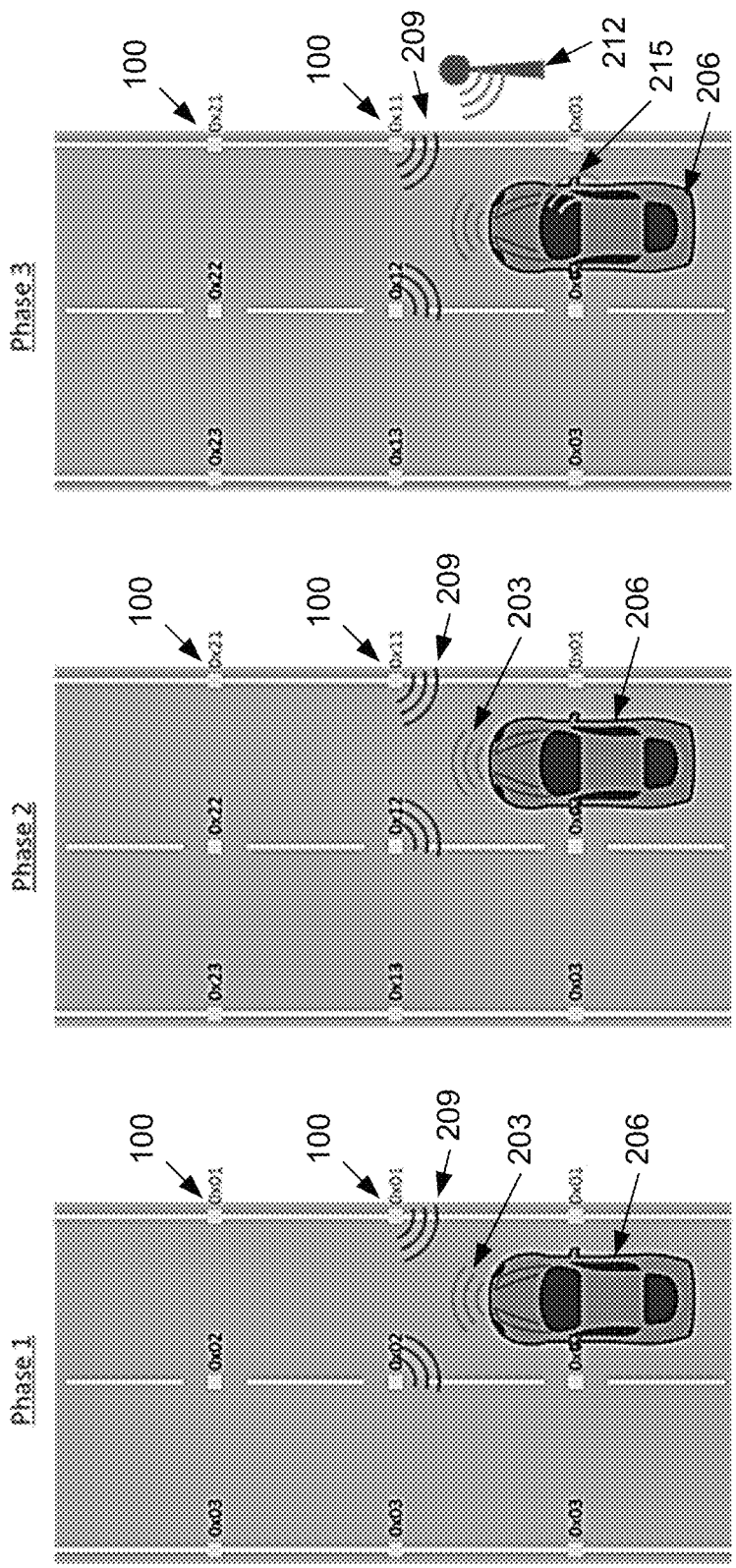
FIGS. 2A through 2C illustrate phases of the GatorEye system, in accordance with various embodiments of the present disclosure.

Referring to FIGS. 2A-2C, shown are graphical representations illustrating the three phase infrastructure of the GatorEye system. The first phase, using the passive RFID tags 106 of the GatorEye units 100, allows simple line following as shown in FIG. 2A. When placed between lanes and illuminated 203 using an appropriate RFID reader on a vehicle 206 as it moves down the roadway, the response 209 from the RFID tag 106 can be used by the vehicle (e.g., an autonomous vehicle) to know if it is correctly positioned in the lane, but the response 209 can also be used to identify which lane the vehicle 206 is in. Due to the RF frequency used in RFID systems, road hazards such as water or snow on the roadway do not interfere with the operation, allowing autonomous vehicles to navigate roads even when the optical cameras cannot find the roadway. The GatorEye system can be implemented for use on highways, as well as city roadways, local driveways, and in parking lots to assist with smart parking (informing parking lot occupancy, vacancy, etc.).

As shown in FIG. 2B, the second phase can use an unpowered active RFID tag 106 to provide an actual location of the GatorEye unit 100. Since more information can be transferred with an active RFID tag 106, many unique addresses can be incorporated into the RFID tag 106 not only providing lane information, but also distance along the lane. This information can be used as a more accurate and more reliable alternative to GPS and/or as markers for road conditions or hazards. These active RFID tags 106 can also be integrated with low power passive/active sensors (e.g., moisture sensors, temperature sensors, and/or ambient pressure sensors) to give live feedback of road conditions to the vehicle 206, which could then be transmitted to other vehicles using the third phase illustrated in FIG. 2C. Additionally, with the very precise positioning system, an additional measure of redundancy/security can be incorporated for surrounding vehicles during operations such as lane changing or approaching traffic stops. In some implementations, the system can include a separate solar panel or a solar panel integrated with the reflector, with which the integrated RFID tag can be powered by natural light sources such as the sun, the moon, and stars, and by artificial light sources such as street lights and the headlights of vehicles. A capacitive power storage can maintain low levels of power for use by the GatorEye system.

Referring next to FIG. 2C, the third phase comprises a system to process the information from vehicles 206 equipped with a RFID reader to create accurate and constantly updating traffic maps of road conditions/hazards, accidents, traffic levels, etc. Using waypoints 212 periodically placed where power is available, such as at traffic lights, other powered traffic control devices along the roadside, or one equipped with a solar panel and/or thermoelectric source, the vehicles 206 can communicate 215 the data that was collected since the previous waypoint. This data can then be processed by a central server to create the up-to-date traffic or road condition maps. These same waypoints 212 can then transfer information about upcoming road hazards, conditions or traffic to other vehicles 206 heading along the same road. They can also provide the speed of driving vehicles and overspeed information to the local, city, or state transportation authorities, complementing speed detection tools such as speed camera and radar systems.

Figure 3:
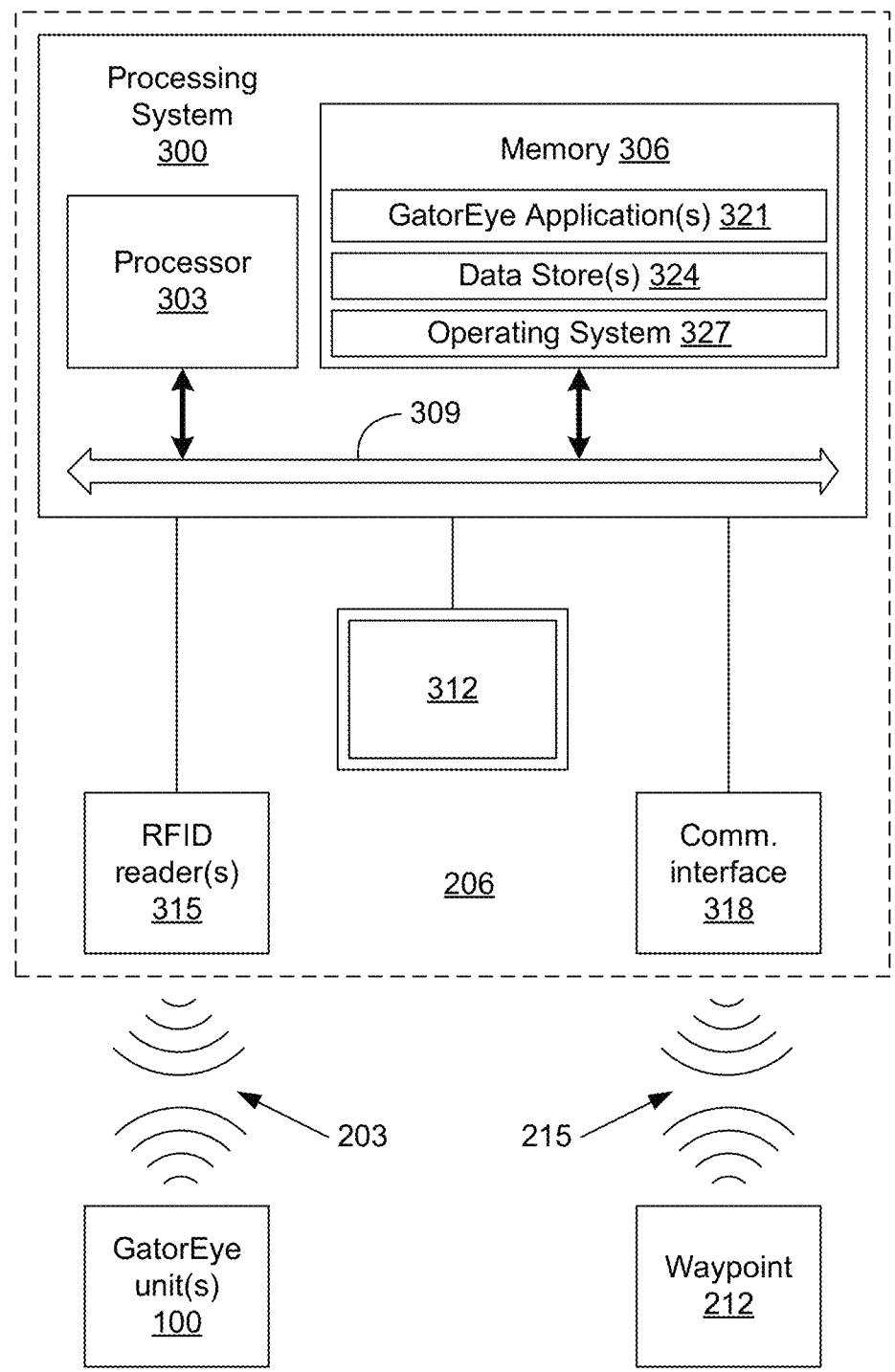
FIG. 3 is a schematic block diagram illustrating an example of a processing system of the GatorEye system, in accordance with various embodiments of the present disclosure.

With reference to FIG. 3, shown is a schematic block diagram of a processing system 300 included in a vehicle 206 (FIGS. 2A-2C) as part of the GatorEye system, in accordance with various embodiments of the present disclosure. The processing system 300 includes at least one processor circuit, for example, having a processor 303 and a memory 306, both of which are coupled to a local interface 309. To this end, the processing system 300 may comprise, for example, at least one computer, tablet, smart phone, or like computing device. The local interface 309 may comprise, for example, a data bus with an accompanying address/control bus or other bus structure as can be appreciated. In addition, the processing system 300 includes operator interface devices such as, e.g., an interactive display 312 (e.g., a touch screen) that provides various functionality for operator interaction with the processing system 300. Various RFID reader systems 315 can also interface with the processing system 300 to allow for acquisition of information from one or more GatorEye unit(s) 100 located along the roadway or in the parking lot. A communication interface 318 allows the processing system 300 to communicate with one or more waypoint 212.

Stored in the memory 306 are both data and several components that are executable by the processor 303. In particular, stored in the memory 306 and executable by the processor 303 are various application modules or programs such as, e.g., a GatorEye module, application, or program 321 for acquisition and evaluation of information obtained from the GatorEye unit 100 via the RFID reader 315. Also stored in the memory 306 may be a data store 324 and other data. In addition, an operating system 327 may be stored in the memory 306 and executable by the processor 303.

The GatorEye module, application, or program 321 can interact with or be included in control systems of autonomous vehicles. The RFID reader 315 can interrogate the RIFD tags 106 in the GatorEye units 100 located along the edges of the lanes. The RFID tags 106 can be passive tags that respond with identifying information that can be used to determine location information associated with the GatorEye units 100. In some embodiments, the RFID tags 106 can be active tags that can respond with sensor information in addition to identifying information. The RFID reader 315 receives the data from the GatorEye unit 100 and provides it to the processing circuitry for evaluation.

The information can be used by the processing system 300 to determine, e.g., location, lane alignment, and/or weather or road conditions. The results of the processing can be provided to the user through the display 312. The data acquired from the GatorEye units 100 can also be communicated to waypoints 212 located along the roadway via the communication interface 318. The wireless communication may use 2.4 GHz WiFi/BlueTooth/Zigbee protocol or 5.9 GHz intelligent transportation system (ITS) protocol. The data can be sent to a central server for processing and further dissemination of the results to other vehicles through the waypoints 212. The processed information can be received by the processing system 300 through the communication interface 318 and provided to the user through the display 312.

It is understood that there may be other applications that are stored in the memory 306 and are executable by the processor 303 as can be appreciated. As any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network that facilitates communication between any two of the multiple processors 303, between any processor 303 and any of the memories 306, or between any two of the memories 306, etc. The processor 303 may be of electrical or of some other available construction.

Although the GatorEye module, application, or program 321 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the GatorEye module, application, or program 321 and/or application(s), that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In some embodiments, readers and/or sensors can monitor a magnetic paint that can be applied when painting lines on roads. However, when trying to get an individual identity from these magnetic lines, a reader must be placed in very close proximity since the dissipation distance of magnetic fields is very short. This can be used to stay between the lines. Because of the magnetic limits, identity reading could place a vehicle as a hazard to adjacent lanes.

The longevity of any smart system placed on the road is limited as traffic will inevitably cause degradation of its components (e.g., paint being scratched off or reflective cat's eyes being removed). In the case of a GatorEye unit 100 being removed, a passing vehicle 206 could easily recognize its absence and report it for replacement at the next waypoint 212. Since GatorEye units 100 can be closely spaced along both sides of the lane, the vehicle 206 can use two units 100 to simultaneously determine its lane position. It can be relatively easy to detect abnormalities without causing unsafe operation of the vehicle 206 and replacement of the device would be simple. Detection of the magnetic paint would similarly be easy, but replacement, if any sort of identifier is present, would be difficult since it would rely on proper alignment to the paint that is still left over.

An RFID infrastructure is presented which can provide a low-cost, feasible, and reliable method for a vehicle to electronically determine its position, lane, and surrounding conditions. Although the GatorEye system would not completely replace all of the functionality of the higher power, more expensive alternatives using optical cameras or LIDAR, it offers a much more reliable system that can be more precise in a variety of road conditions and complement those alternative optical systems. The GatorEye system can take the lead role in autonomous vehicle operation, allowing the alternative systems to act as supporting roles for detecting extraneous road hazards.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. An apparatus for smart transportation sensing, comprising:
    a reflector integrated in a contoured roadway unit configured to protect the reflector from damage by vehicles traveling along a transportation surface;
    one or more sensors integrated in the contoured roadway unit and configured to measure one or more environmental conditions of the transportation surface as sensor data; and
    a radio frequency identification (RFID) tag integrated in the contoured roadway unit, wherein the RFID tag is an active RFID tag configured to provide the sensor data in response to interrogation by an RFID reader.

2. The apparatus of claim 1, wherein the RFID tag is configured to provide identifying information in response to interrogation by the RFID reader.

3. The apparatus of claim 1, wherein the one or more sensors are a temperature sensor, a moisture sensor, an ambient pressure sensor, or an air pollution sensor.

4. The apparatus of claim 3, wherein the RFID tag provides sensor data from a plurality of sensors.

5. The apparatus of claim 1, wherein the transportation surface is a roadway or a parking lot or deck.

6. The apparatus of claim 5, wherein the roadway is a highway, a city street, a local driveway, or an access road.

7. The apparatus of claim 1, further comprising a solar panel integrated in the contoured roadway unit and configured to supply power to the one or more sensors and/or the RFID tag.

8. A system for smart transportation, comprising:
    a vehicle comprising:
        a radio frequency identification (RFID) reader configured to interrogate RFID tags integrated in reflector units disposed along a transportation surface, wherein the RFID tags are integrated with one or more environmental sensors; and
        a processing system in communication with the RFID reader, the processing system configured to process data obtained from at least one of the RFID tags to determine vehicle location along the transportation surface and an environmental condition of the transportation surface.

9. The system of claim 8, wherein the transportation surface is a roadway.

10. The system of claim 9, wherein the vehicle comprises a communication interface configured to communicate with a waypoint communication device located along the roadway.

11. The system of claim 10, wherein the processing system transmits the data from the at least one RFID tag to a central server via the communication interface and the waypoint communication device.

12. The system of claim 11, wherein the central server processes the data to determine the environmental condition of the roadway.

13. The system of claim 12, wherein the central server communicates the environmental condition to the processing system via the waypoint communication device.

14. The system of claim 12, wherein the central server communicates the environmental condition to another vehicle on the roadway.

15. The system of claim 10, wherein the waypoint communication device is integrated with a traffic light.

16. The system of claim 8, comprising the reflector units disposed along a roadway, the reflector units comprising passive RFID tags, active RFID tags, or a combination of both.

17. The system of claim 8, wherein the reflector units comprises active RFID tags.

18. The system of claim 8, wherein the processing system is further configured to determine position of the vehicle within a lane on the transportation surface based upon the data obtained from the at least one RFID tag.

19. The system of claim 8, wherein the transportation surface is a parking lot or deck, and the processing system is further configured to identify a vacant parking spot based upon the data obtained from the at least one RFID tag.

20. The system of claim 8, wherein the vehicle is an autonomous vehicle.

* * * * *